(12) United States Patent
Burmester (10) Patent No.: US 7,191,791 B2
(45) Date of Patent: Mar. 20, 2007

(54) DEVICE FOR ACTUATING DOUBLE SEAT VALVES

(75) Inventor: Jens Burmester, Grambek (DE)

(73) Assignee: Tuchenhagen GmbH, Buchen (DE)

(*) Notice: Subject to any disclaimer, the term of this patent is extended or adjusted under 35 U.S.C. 154(b) by 5 days.

(21) Appl. No.: 10/523,570

(22) PCT Filed: May 26, 2003

(86) PCT No.: PCT/EP03/05509

§ 371 (c)(1),
(2), (4) Date: Jan. 28, 2005

(87) PCT Pub. No.: WO2004/015314

PCT Pub. Date: Feb. 19, 2004

(65) Prior Publication Data

US 2006/0108550 A1    May 25, 2006

(30) Foreign Application Priority Data

Jul. 29, 2002    (DE) .............................. 102 34 482

(51) Int. Cl.
*F16K 1/44*    (2006.01)

(52) U.S. Cl. ................. 137/312; 137/240; 137/614.17; 137/614.18; 137/614.19

(58) Field of Classification Search .......... 137/614.17, 137/614.18, 614.19, 240, 312
See application file for complete search history.

(56) References Cited

U.S. PATENT DOCUMENTS 6,009,896 A * 1/2000 Van Oosten ................. 137/240
6,279,602 B1 * 8/2001 Bonnefous et al. ..... 137/614.18

FOREIGN PATENT DOCUMENTS

| DE | 3 133 273 | 3/1983 |
|---|---|---|
| EP | 0 545 846 | 6/1993 |
| EP | 0 868 619 | 10/1998 |
| EP | 1 030 988 | 8/2000 |
| WO | 9 722 821 | 6/1997 |

* cited by examiner

*Primary Examiner*—Kevin Lee
(74) *Attorney, Agent, or Firm*—Vidas, Arrett, Steinkrad (57) ABSTRACT

The invention relates to a device for actuating double seat valves, which are especially suitable for the food and beverage industry and which have an independently actuated first closing element (3), which is designed as a sliding piston and a fully dependent on this actuated second closing element (4), which is designed as a seat disc, whereby the actuator (100, 200) produces at all times using a main adjustment device (100) for the fully open position (H) as well as, for the case of maximum requirements, the respective individual adjustment devices (200; 200.1, 200.2) which are assigned to the closing elements (3, 4) for generation of the partially open positions (T1, T2) acting in opposite directions for the seat cleaning of the closing elements (3, 4). The object of the invention is to design a device according to this generic type in such a manner that it is constructed as simply as possible and is easily and economically adjustable to the various requirements which are put onto a double seat valve of the type in discussion (only full opening stroke or full opening stroke as well as seat cleaning partial strokes). This is thus achieved in that the individual adjustment devices (200; 200.1, 200.2) are designed stand-alone and are additively inserted between the main adjustment device (100) and a valve housing (1), that the third working piston (206;206/206.1) is positioned able to be moved axially on the second control rod (4*a*, 204) which is designed as a hollow rod, and encloses the first control rod (3*a*, 203) and is able to be brought in the direction of the second partially open position (T2) in a clamped connection, that the second actuating piston (205) is tightly connected on one side with the first control rod (3*a*, 203) which adjusts the first closing element (3), that it is otherwise directly or indirectly positioned able to be moved axially on a first actuator stem (103) of the main adjustment device (100) and is able to be brought with this in the direction of the fully open position (H) in a clamping connection, and that it is able to be loaded with pressurizing medium on each of its two piston surfaces (FIG. 2).

19 Claims, 6 Drawing Sheets

DEVICE FOR ACTUATING DOUBLE SEAT VALVES

CROSS-REFERENCE TO RELATED APPLICATIONS

Not Applicable

STATEMENT REGARDING FEDERALLY SPONSORED RESEARCH

Not Applicable

BACKGROUND OF THE INVENTION

Prior Art

A device according to this generic type is known from EP 0 868 619 B1. The device diagrammed in FIG. 6 and explained briefly in the attached description is in fact not subject matter of the patent claims of this publication, however the features disclosed prove how through simple modification to the protected actuating device 1 (reference numbers of the figures therein) a double seat valve can be activated, whose independently actuated first closing element 4 is designed as a sliding piston with radial sealant and whose dependently actuated second closing element 5 is designed as a seat disc. In this closing element configuration the partially open position T1 of the first closing element 4 is completed in the opposite direction to the opening stroke H, which is directed upwards relative to the diagrammed position of the valve. For execution of the partially open position T1 a main piston 106 of the main adjustment device 1a is loaded from above with pressurizing medium D2 using a non-specified pressurizing medium connection. The partial stroke limit downwards of the first closing element 4 occurs in that a valve stem 104 takes its bearing on the latter through a non-specified recess above a spring abutment 119. The partially open position T2 of the attached actuated second closing element 5, which only has a freedom of motion upwards due to its design as a seat disc, is done using a piston 108, which is loaded with pressurizing medium D3 using a first pressurizing medium connection 117. The synchronization of a hollow bar 105 connected with the second closing element 5 upwards is done using its hollow bar head 105a. The partial stroke limit of the piston 108 is implemented through a second recess 114a on the stop sleeve 114.

Figure 1:
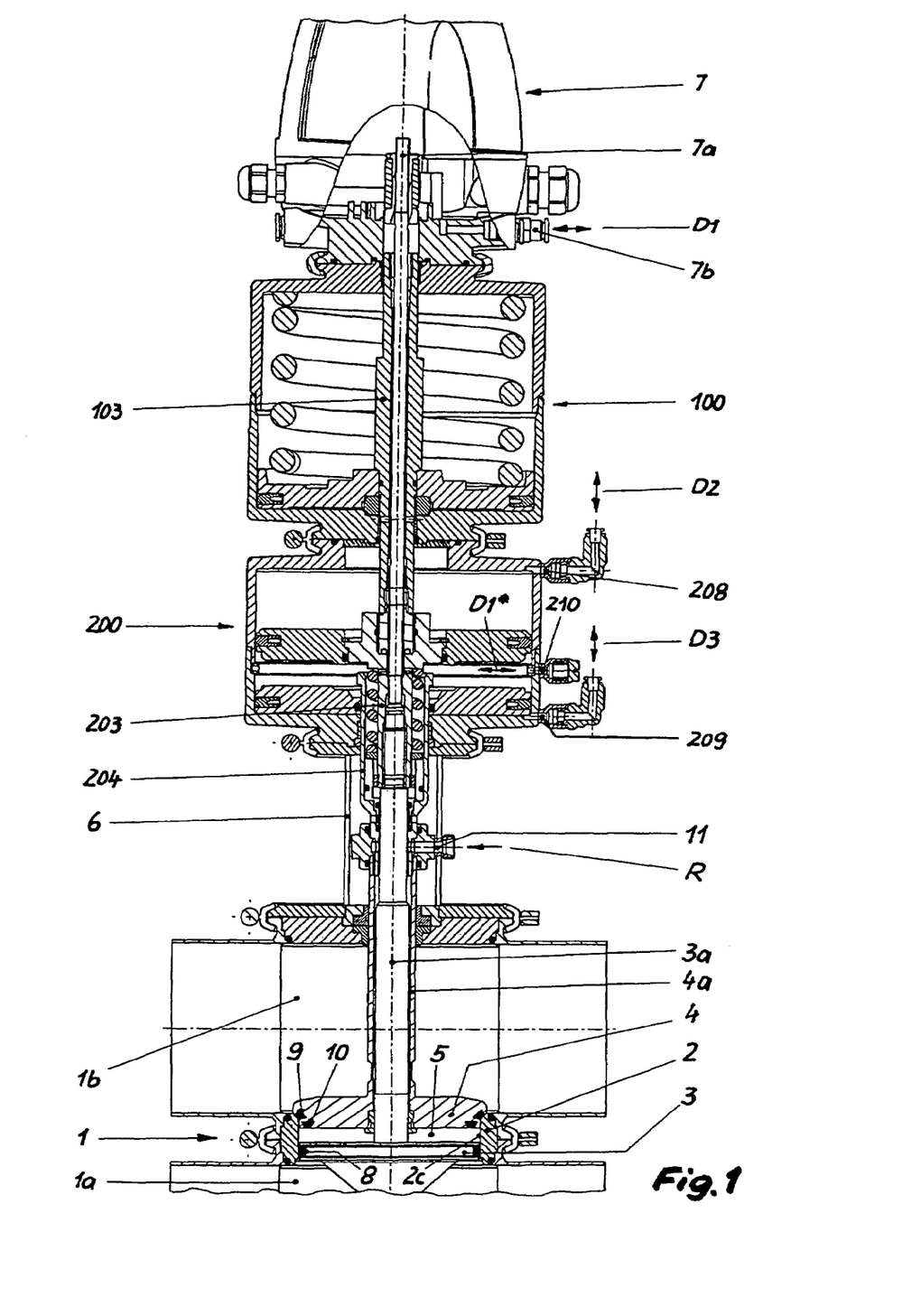
FIG. 1 shows a middle cross-section through a first embodiment of a device for actuating double seat valves of the generic type according to the invention, whereby the referenced double seat valve in the closed position in this reference is arranged below the proposed device and a control device (in broken-out section) is arranged above it.

The preceding briefly described actuator is also designated in expert circles as a so-called "integrated" actuator, because it accommodates the main adjustment device 1a for the full opening stroke H as well as the individual adjustment devices 1b, 1c for the partially open positions T1 and T2 in a common housing. These types of actuators are as a rule compactly built and make it possible to arrange a so-called control module and/or control head 8 (FIG. 1) directly above the main adjustment device 1a, if the individual adjustment devices 1b, 1c are arranged in the previously described manner in reference to the main adjustment device 1a.

The significant disadvantages of the integrated actuators arise also from the fact that they are designed for the maximum requirements which are placed on double seat valves of the type under discussion. Maximum requirements are then given if, along with the full opening stroke H which is executed by the main adjustment device, the opposed partially open positions T1, T2 of both closing elements for the execution of the respective seat cleaning, which is carried out by an individual adjustment device assigned to each closing element to be activated, are necessary. Since a large portion of the double seat valves placed in installations in the food and beverage industry are in applications without the possibility or necessity of seat cleaning, because only mixing efficiency is required, integrated actuators in which only the main adjustment device is activated are normally too complex and therefore uneconomical. In practice these types of applications then fall back on "normal" actuators (standard actuators) for double seat valves, which only accommodate a main adjustment device for the full open position H. Thereby the number of integrated actuators from a manufacturer of double seat valves is reduced, since each double seat valve corresponding to the requested requirements is at best equipped with a suitable actuator for this purpose and thereby results in an uneconomical number of manufactured integrated actuators as the case may be.

A further integrated actuator for a double seat valve according to this generic type is known from the EP 1 030 988 B1. The kinematics of this actuator corresponds in an identical manner to that according to FIG. 6 in the EP 0 868 619 B1. In contrast to the latter, in the former the partial stroke movement T1 opposed to the full opening movement H of the independently actuated first closing element which is designed as a sliding piston is executed by a separate third working piston 30, which is arranged above the first working piston 18, which causes the full opening stroke H. The general arrangement is therefore in fact more complex, however by the separate third pressure chamber 39 created over the third working piston 30 the necessary volume for its loading with pressurizing medium is significantly reduced compared to the corresponding pressure chamber over the main piston in actuation of the double seat valve according to EP 0 868 619 B1, whereby less pressurizing medium is used when switching the assigned partial stroke movement T1 and the actuation reacts quicker to the switching command in this regard. At the same time the integrated actuator according to EP 1 030 988 B1 is in turn also relatively complexly constructed and flawed with the preceding briefly presented further disadvantages in connection with the integrated actuator according to EP 0 868 619 B1.

In DE 31 33 273 C2 it was already proposed for a cleanable double seat valve with leakage control, to additively insert the individual adjustment devices between the main adjustment device and a lantern housing under the main adjustment device which exclusively creates the full stroke for the full open position as the only adjustment device without changing the neighboring standard member. However it is concerned here with a double seat valve, which has two closing elements designed as seat discs, so that the full stroke H for the full open position and both partial stroke movements T1, T2 are aligned for gapwise removal of the closing elements from their respective seat surfaces. These attainable advantages with this so-called "modular" actuator concept especially exist in that to the greatest possible extent a standardized double seat valve, which has available a standard actuator for the creation of the fully open position through additive of relatively simple individual adjustment devices, contains special functions in regards to the previously described creation of partially open positions of both closing elements. From DE 31 33 273 C2 there are no details to be taken on whether the known modular actuator concept is applicable to double seat valves of the preliminary characterized type and not at all what this type of solution could look like.

The dependently actuated closing element of the double seat valve, which is also designated as a double disk with its two seals, is in fact not critical during the seat cleaning in regards to its partially open position T2 and can therefore be moved against a fixed stop for the execution of the aligned seat cleaning position. This stop therefore needs no complex pre-adjustment or readjustment. During the seat cleaning the cleaning solution is normally under pressure on the dependently actuated closing element, so that this must be opened by the partial stroke T2 against the resulting closing force from the corresponding pressure and the assigned effective surface of this closing element. To overcome this closing force or holding down force the assigned second individual adjustment device is to be dimensioned accordingly. Either a sufficiently large piston surface of the actuating piston in this second individual adjustment device is to be provided or the pressure of the pressurizing medium loaded on the actuating piston is to be correspondingly increased if there are restrictions in regards to the dimension of the diameter of the actuating piston. An adjustment of the actuator to the existing pressure conditions using a corresponding dimensioning of the actuating piston is always primarily a question of cost and is normally only chosen if other possibilities are not available. The choice of a higher pressure of the pressurizing medium is normally preferred; it is however always eliminated in practice if the installation or plant in which the cleanable double seat valve is installed does not have a pressure level available in this regard or out of cost considerations can not be additionally done.

It is the object of the present invention to design a device according to this generic type in such a manner that it is constructed as simply as possible and is easily and economically adjustable to the various requirements which are put onto a double seat valve of the type in discussion (only full opening stroke or full opening stroke as well as seat cleaning partial strokes).

Furthermore in the scope of an advantageous embodiment of the proposed device a larger flexibility should be ensured in the adjustment of the second individual adjustment device for the partial stroke movement of the dependently actuated closing element on the available pressure of the pressurized medium.

SUMMARY OF THE INVENTION

One obvious first advantage of the proposed solution lies in that for the first time a solution is disclosed on how the motion kinematics of a double seat valve capable of seat cleaning of the type in discussion with a modular actuator concept is implemented, in which the main adjustment device has a standard actuator and the individual adjustment devices are independently designed and are inserted between the standard actuator and the valve housing or a lantern housing connected with it. For that reason henceforth it is possible to equip double seat valves which are capable of seat cleaning and those that are not capable of seat cleaning with the same standard actuator for the full opening movement of the valve. Thus on the one hand the best conditions for an economic number of production pieces of this type of standard actuators prevail and on the other hand for each double seat valve only the corresponding necessary actuator parts are used.

Furthermore the proposal makes possible the implementation of special functions, namely the execution of the partial stroke movement T1, T2 of both closing elements for the purpose of their seat cleaning by means of stand-alone individual adjustment devices, economically justifiable for initial equipment of double seat valves, as well as for the refitting of already available double seat valves, which were previously normal switching, however more capable of seat cleaning.

The insertion of stand-alone individual adjustment devices in a relatively complex structure, as is demonstrated in a double seat valve, is therefore possible because the individual members within the scope of a modular system are normed or standardized in their connections and joints as far as possible. This is true for the main adjustment device (standard actuator) as well as for the lantern housing adjacent to the valve housing and the control rods led through from the upper valve housing member. The housing connection is done preferably using standardized so-called clamping ring connections and the control rods are screwed together at the corresponding locations. Due to the arrangement of the individual adjustment devices between the main adjustment device and the valve housing, the other side of the main adjustment device remains free for the arrangement of a control device, which among other things monitors the path of motion and the discrete end locations of the closing elements and takes over the entire control logic as well as the pilot valve.

A further advantage results from the axial decoupling of the first valve stem, which extends into the area of the individual adjustment devices in a second actuator stem, connected with the independently actuated first closing element or from the corresponding decoupling of the second actuating piston permanently axially connected with the first valve stem from a first actuator stem which is arranged in the main adjustment device and at the same time reaches into the area of the individual adjustment devices. The partial stroke movement T1 of the independently actuated, first closing element which is designed as a sliding piston opposite to the full opening stroke H of the valve is first possible by this decoupling.

On the other hand it allows the first executable axially movable positioning of the second actuating piston by the previously named uncoupling onto the first actuator stem, this if needed, namely with the full opening movement to push in the direction of this opening movement so far on the bearing location until it arrives in a clamping connection. In this clamping connection the second actuating piston supports from now on the main adjustment device in the opening stroke H, since the second actuating piston according to the invention is able to be loaded with pressurizing medium on each of its two piston surfaces and through this can make an additional independent opening force available in the direction of the full opening movement of the double seat valve. The second actuating piston and with it the assigned individual adjustment devices thus have the function of a so-called "batch actuator" in this movement phase of the actuating.

The special actuating kinematics of the proposed device lies in that the force flow from the second actuating piston can act through the first actuator stem and the first actuating piston onto the prestress force of the main spring. Conversely however it is not possible through the axial decoupling between the main adjustment device and the individual adjustment devices, to transfer an opening force to the first closing element from the main adjustment device. An opening of the double seat valve alone with the help of the main adjustment device is therefore not possible. It is mandatory for the opening of the double seat valve to always be done according to specifications through the stroke movement of the first actuating piston, but only then when the second actuating piston of the first actuator stem in the main adjustment device follows in the corresponding force supporting trailing action.

Since the second actuating piston, not in a necessary but desirable manner, has approximately the same piston cross-section as the first actuating piston in the main adjustment device, the possibility arises through the aforementioned batch function to significantly reduce the size of the main adjustment device relevant to the opening force (this is primarily the diameter), whereby among other things a significant cost reduction takes place. On the other hand from the aforementioned circumstances the possibility arises to actuate the double seat valve without reduction of the size ratio of the actuator even with a low operating pressure of the pressurized medium.

Both stand-alone individual adjustment devices are built space-saving and compact, if they, as it is proposed, are arranged in a single housing designed from two housing members and with their actuating pistons there form three pressurizing medium chambers actuating independently of one another, whereby the second pressurizing medium chamber between the second actuating piston and the third housing member, the third pressurizing medium chamber between the third actuating piston and the fourth housing member and the fourth pressurizing medium chamber between both of the two actuating pistons form the individual adjustment devices.

If, as this is further proposed, the first actuator stem of the main adjustment device leads out through the latter in the direction of the individual adjustment devices and is guided axially movable there in the front end of the second actuator stem which is permanently connected to the first control rod up to a stop face, then it is possible to make the second actuating piston out of corrosion resistant light alloy, preferably out of aluminum. This would furthermore be proposed for the other actuating pistons as well, due to cost and weight saving reasons.

For easier adjustment of the actuator of the second individual adjustment device, which is assigned to implement the partial stroke T2 for the dependently actuated closing element, a different, however above all relatively low pressure of the pressurized medium provides a further embodiment of the proposed device, that the third actuating piston is fixed, however able to be loosened, on its side toward the second actuating piston with a smaller diameter additional piston, that the additional piston working together with a housing ring fixed on the housing of the individual adjustment devices forms a fifth pressurizing medium chamber, which is connected with a third pressurizing medium chamber formed between the third actuating piston and the fourth housing member, and that with the introduction of a third pressurizing medium flow to the third pressurizing medium chamber also additionally in the fifth pressurizing medium chamber an additional force results affecting the additional piston, which additively superimposes on the force affecting the third actuating piston. Through the arrangement of an additional piston on the actuating piston of the second individual adjustment device the latter gains a function, which is also often designated as a so-called "batch function". The actuating piston experiences quasi a surface enlargement through the additional piston, which indeed does not have the effect of a larger diameter piston surface by the chosen arrangement, but rather is found in a second, parallel plane. In the present case the pressurizing medium reaches the actuating piston first and finally the additional piston, in order each time to develop a force on the respectively arranged pistons through the installed piston surfaces, whereby these two forces, the force on the actuator pistons and the additional force on the additional pistons are additively superimposed on each other.

A compact arrangement of the second individual adjustment device with additional pistons is attained according to a further proposal, in that the additional piston has a larger diameter external piston section and a smaller diameter interior piston section, that the interior piston section is sealed on the face side against the third actuating piston and bolted to it, that the exterior piston section is sealed on the circumference against the shell of a cylindrical cutout in the housing ring and the interior piston section is sealed on the circumference in a coaxial through-bore in the housing ring, and that in the connection area of the third actuating piston with the additional piston are arranged in the former a first pressurizing medium channel and in the latter a second pressurizing medium channel, which correspond with one another and connect the third pressurizing medium chamber and the fifth pressurizing medium chamber with one another permeable to the pressurizing medium. The housing ring which is fixed in the housing of the individual adjustment devices forms on the one hand, with the additional pistons, the necessary additional fifth pressurizing medium chamber and creates on the other hand through its housing side support, the physical conditions for the addition of the additional force to the force on the third actuating piston. The latter borders the third pressurizing medium chamber in connection with the fourth housing member, in which the third pressurizing medium flow is first introduced in order to then finally reach into the fifth pressurizing medium chamber.

According to a further advantageous embodiment the housing ring has a radial projection on the circumferential side, with which the housing ring is arranged form fit to the connection area between the third and the fourth housing member. The assembly of the housing ring is simple under these conditions, since the latter is inserted in the third and the fourth housing member, before these are then connected with one another, preferably integrally joined. It shall be understood that also a detachable connection between the third and the fourth housing member can be made.

The device according to the invention is designed either with or without additional pistons. Since it is an advantage for the housing of the individual adjustment devices with the pressurizing medium connection which comes into question to always be designed identically regardless of whether an additional piston is present or not, a further embodiment of the proposed device is designed, that a fourth pressurizing medium connection for an alternative first pressurizing medium flow for loading the second actuating piston which is arranged in the third housing member discharges into an upstream fourth pressurizing medium chamber in the area between the third actuating piston and the housing ring, and that the upstream fourth pressurizing medium chamber is connected with a fourth pressurizing medium chamber designed between the second actuating piston on the one hand and the housing ring in connection with the additional piston on the other hand through at least one connection channel, which is arranged in one of the cylindrical cutout outside encompassing part of the housing ring. Through this arrangement the fourth pressurizing medium connection can remain on any position in the housing of the individual adjustment devices on which it is arranged if the second individual adjustment device is not equipped with an additional piston. The connection channel in the housing ring ensures the permeability for the pressurizing medium, so that the pressurizing medium introduced through the fourth pressurizing medium connection can get from one side of the housing ring to its other side under the second actuating piston.

The relatively simply designed total actuator, which experiences a clearly functional separation through its modular design, is relatively unproblematic in regards to adding additional manufacturing tolerances of its individual members, since the closing elements each open in their respective seat cleaning positions non-critical in the arranged valve housing members and therefore danger of collision in the process of the partially open positions T1, T2 do not exist. For this reason the proposed device needs no adjustable stops for limiting the respective partial stroke movements of the closing elements in the process of their seat cleaning, rather there are conceivable simple end-of-travel limit stops. In this regard a proposal is envisaged that the end-of-travel limit stops of the second actuating piston for the first partially open position T1 and that of the third actuating piston for the second partially open position T2 are done by a stop-ring or housing ring arranged permanently between the actuating piston and axially movable on both sides.

It is further proposed that the fourth pressurizing medium chamber is connected according to the stream with a first pressurizing medium connection, which is equipped on a control device arranged in the connection to the main adjustment device. Since according to an advantageous embodiment this connection is done within the main adjustment and the individual adjustment devices, in this way the first pressurizing medium chamber of the main adjustment device can also be supplied with pressurizing medium, so that external pressurizing medium connections for controlling the full opening stroke H are not necessary either on the main adjustment device nor on the housing of the individual adjustment device.

Nevertheless a further embodiment is allowed for, alternative to the preceding proposed solution, to provide the fourth pressurizing medium chamber with a fourth pressurizing medium connection, which is designed to be on the housing of the individual adjustment devices. Through retention of the internal connection lines between the first and the fourth pressurizing medium chamber there exists an additional possibility for control with this solution, to activate the full opening stroke of the double seat valve over this external fourth pressurizing medium connection, whereby the first pressurizing medium connection on the control device is then omitted or can be blinded.

Along with the axial decoupling of the first valve stem or the second actuating piston from the first actuator stem in the main adjustment device there is a further advantageous embodiment allowed for, to additionally put into effect a rotating decoupling between the aforementioned members at this decoupling location. As is generally known in the axial deformation of a helical spring, as is provided as the main spring in the main adjustment device, considerable torsional moments are transferred from the spring onto its abutment, in this case on the first actuating piston loaded from this and therefore on the first actuator stem. These torsional moments can cause loosening of the actuator stems and adjustment rods which are bolted together. Through the proposed rotating decoupling between the main and the individual adjustment devices the aforementioned rotation on the first actuator stem remains limited; a transfer of a torque on other members in the area of the individual adjustment devices and the double seat valve is impossible.

The rotating decoupling proves to be especially advantageous if, according to a further proposal, the frontal end of the first actuator stem has a header, which engages into a cutout within one of the headpieces that is formed onto the second actuator stem and that has a larger diameter compared to it. The sliding conditions are thereby improved in that a plain bearing bush is placed between the header and the cutout.

In order to be able to realize the axial position of the independently actuated first closing element even after the axial decoupling of the first actuator stem in the control device, according to a further proposal a position indicator rod is provided, which each time concentrically penetrates the first actuator stem completely and the second actuator stem to the first control rod, which on the one side ends in a control device and on the other side is screwed with its frontal end in the second actuator stem and thereby counter secures the screw connection between the adjustment rod and the actuator stem on a first end surface of the first control rod with its arranged second end surface. The proposed jam nut makes difficult or prevents loosening of the screw connection between the first control rod and the second actuator stem in the area of the second individual adjustment device.

The ring channel, which is designed between the position indicator rod on the interior and the first actuator stem, the header, the headpiece and the second actuator stem each on the exterior, is advantageously used as a route of transport for the pressurizing medium to the first pressurizing medium chamber, as well as to the fourth pressurizing medium chamber, whereby the distribution of the pressurizing medium in these spaces is done with the appropriate cross holes.

Through the preceding described batch function of the first individual adjustment device working together with the main adjustment device designated for the generation of the full opening stroke H, a reduction of the diameter size of the main adjustment device is possible, so that the housing of the main adjustment device and that of the individual adjustment devices can be implicitly designed with the same diameter, whereby according to the requirements the latter must bring a lower actuating force than the main adjustment device. Thereby it is again possible, as a further proposal shows, to make the housing members of the main adjustment device and those of the individual adjustment devices from housing rough parts of the same shape, whereby a further cost reduction results.

The manufacturing costs can be further reduced in that the housing members of the main adjustment device and those of the individual adjustment device are each integrally joined together, preferably through welding. It is understood that the housing members coming into question can also be connected with each other in a detachable manner.

Overall it has been shown that the proposed device for actuating double seat valves, is realized first of all with a so-called modular actuating concept and secondly, further cost reducing actions were proposed compared to the known so-called integrated actuating leading to a significant reduction of the manufacturing costs which amounts to half of the previous costs.

BRIEF DESCRIPTION OF THE DRAWINGS

Exemplary embodiments of the proposed device for actuating double seat valves according to the invention are represented in the drawing and are described following according to design and function, wherein:

FIG. 6 a middle cross-section through a second embodiment of the individual adjustment devices according to the invention, whereby the third actuating piston is connected with an additional piston and thus the arranged second individual adjustment device supports a so-called "batch function" and FIG. 6a a section from the individual adjustment devices according to FIG. 6 in the area of the screw connection between the third actuating piston and the additional piston.

DETAILED DESCRIPTION

The proposed device 100, 200 (FIG. 1) is used for actuating a double seat valve, that is essentially made up of a valve housing 1 with a first and a second valve housing member 1a or 1b, two closing elements 2 and 4 which move independently to each other using the arranged adjustment rods 3a or 4a in each case, a seat ring 2 which makes a connection between the valve housing members 1a, 1b using its inner connection orifice 2c, a lantern housing 6 connecting the second valve housing member 1b with the device 100, 200, as well as a control device 7, whereby the latter is arranged on the side of the device 100, 200 opposite to the double seat valve.

The independently actuated, first closing element 3 designed as a sliding piston is equipped on the circumference with a first seat seal 8 working exclusively in the radial direction, which is attached to a first seat surface 2a (FIG. 2), which is formed from the cylindrical surface in the seat ring 2 which borders the connection orifice 2c. The dependently actuated second closing element 4 designed as a seat disc has in its seat area a second seat seal 9 which works in both the radial and axial direction, and which works together on the second seat surface 2b also designed on seat ring 2. Between the two closing elements 3, 4 a leakage chamber 5 is formed which in the fully open position H of the double seat valve (FIG. 3) is sealed against its environment by means of a seal 10 working exclusively in the axial direction, which is arranged on the end surface of the second closing element 4 facing the leakage chamber 5.

The leakage chamber 5, as well as the adjacent parts impinged by the flow, can be cleaned in the closed as well as in the open position of the double seat valve (see also FIGS. 2, 3 along with FIG. 1) by means of a cleaning solution R which is introduced through a cleaning solution connection 11 which is arranged in the area of the lantern housing 6 on the second control rod 41, preferably a non-specified ring channel, between the first and the second control rods 3a, 4a. The removal of this type of "externally" introduced cleaning solution R from the leakage chamber 5 is done here by a non-specified connection line which is arranged in a tubular extension leading through the first valve housing part 1a and out of it on the first closing element 3.

Figure 4:
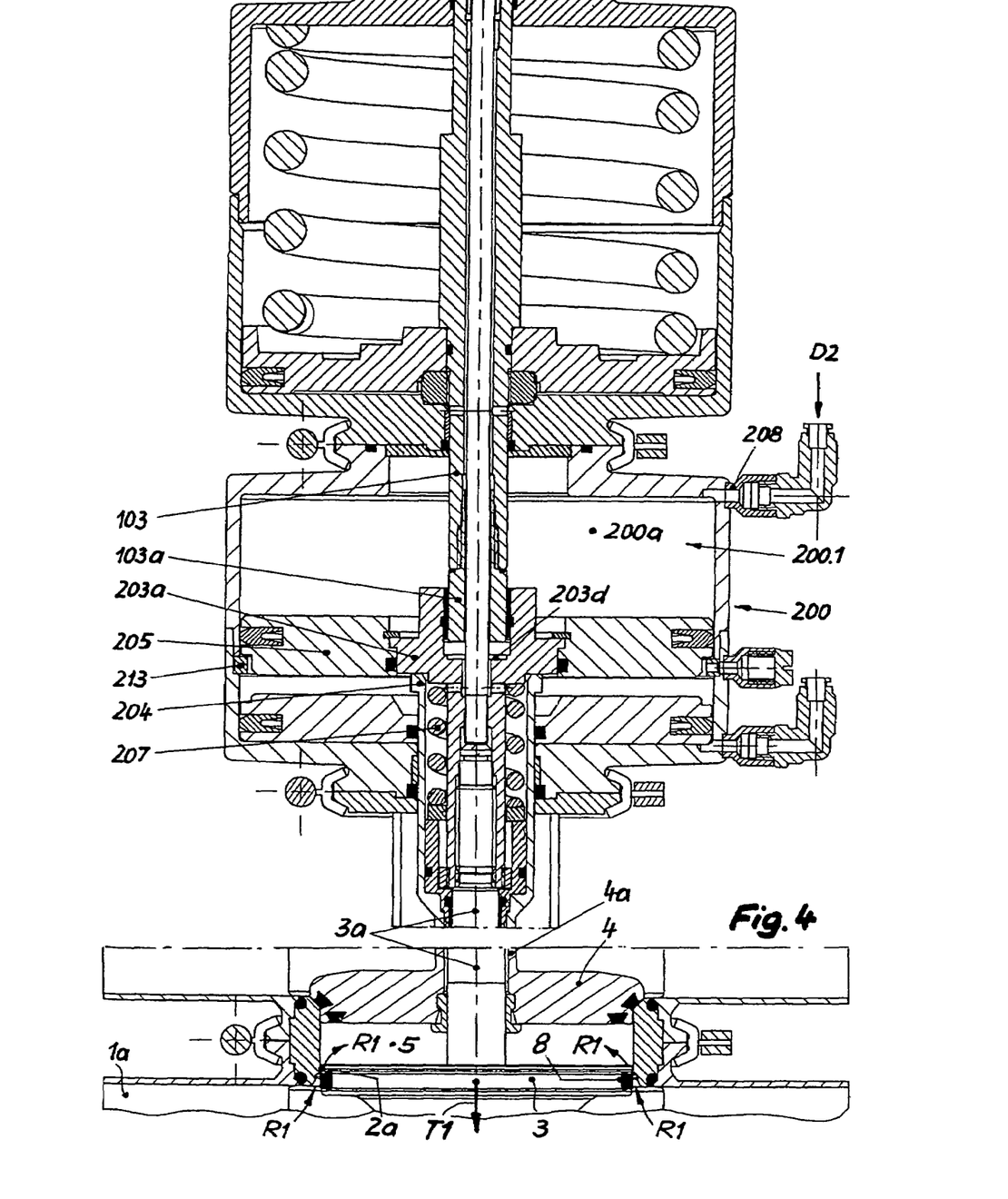
FIG. 4 also shows the device in middle cross-section and both arranged closing elements according to FIG. 2, whereby the members of the device coming into question henceforth are found in one of the corresponding location of the seat cleaning positions of the first closing element designed as a sliding piston and FIG. 5 also shows in middle cross-section the device and both arranged closing elements according to FIG. 2, whereby the parts of the device coming into question henceforth are found in one of the corresponding locations of the seat cleaning positions of the second closing element designed as a seat disc.
Figure 5:
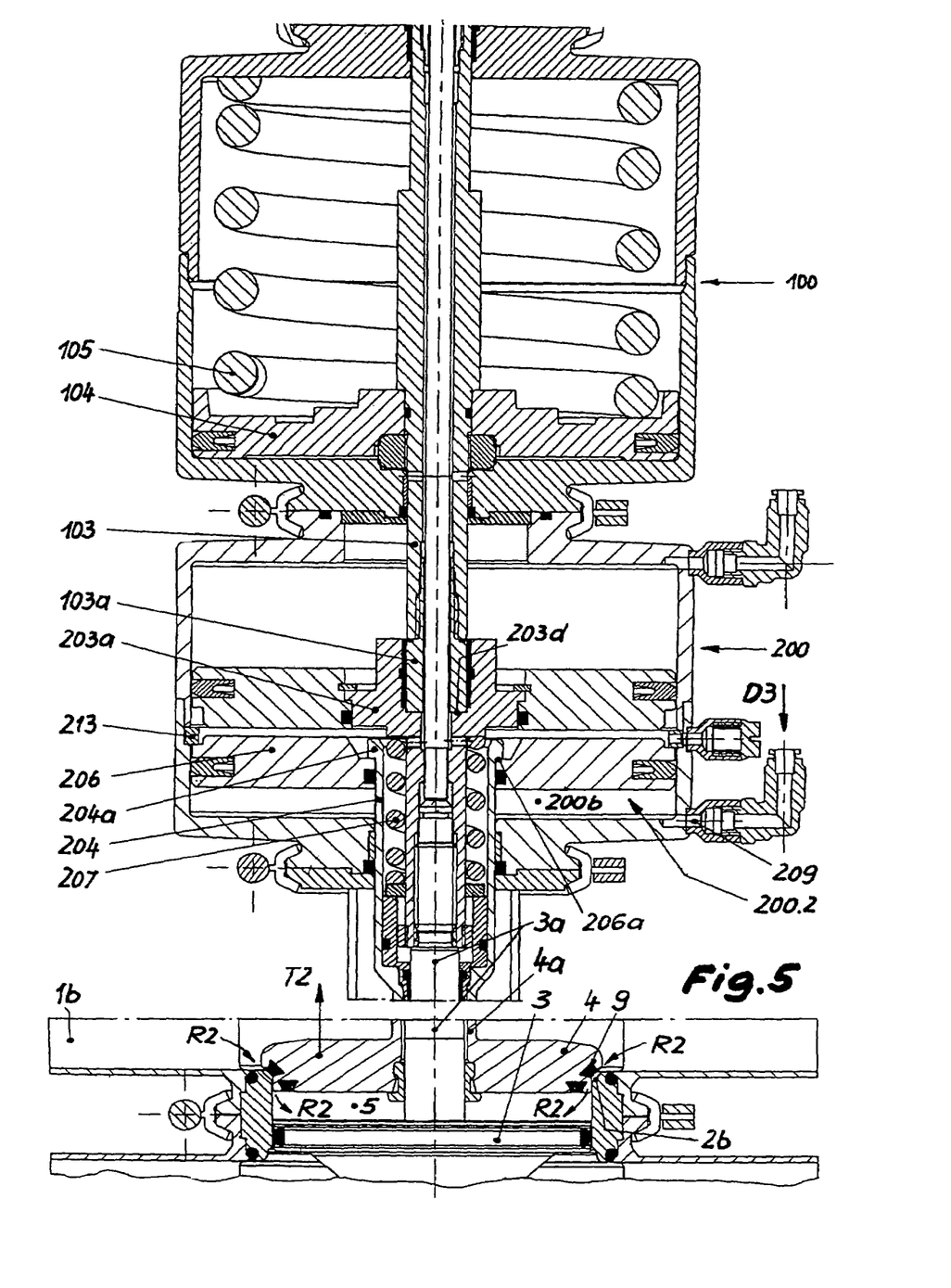

The removal of an "internally" introduced cleaning solution by a particular seat cleaning stream R1, R2 from the internal chamber 5, which is introduced from the valve housing part 1a or 1b assigned at any one time during the seat cleaning of the first or the second closing element 3, 4 (also see for this FIGS. 4 and 5), is done in the same manner as with the external cleaning introduction R. In the seat cleaning of the first closing element 3, which is designed as a sliding piston, this is pushed so far in the direction of the first valve housing member 1a (FIG. 4), that a first partially open position T1 consequently occurs, in which the first seat seal 8 has left the assigned first seat surface 2a and the first seat cleaning stream R1 from the first valve housing member 1a is generated over the exposed first seat surface 2a in the leakage chamber 5.

For seat cleaning of the second closing element 4, which is designed as a seat disc, this is pushed so far in the direction of the second valve housing member 1b (FIG. 5), that in a thus partially open position T2 taken from the second closing element 4, the second seat seal 9 left the assigned second seat surface 2b and the second seat cleaning stream R2 from the second valve housing member 1b arrives into the leakage chamber 5 on the way over the exposed seat surface 2b.

To limit the amount of cleaning solution in each of the seat cleaning streams R1, R2 during the seat cleaning, if necessary known cylindrical projections are provided on the closing elements 3, 4, oriented toward the leakage chamber 5, which during gapwise removal of the closing elements 3, 4 from their assigned seat surfaces 2a, 2b still reaches sufficiently far with radial clearance into the connection orifice 2c with the respective cylindrical projection and there in each case forming a so-called choking annular gap. Alternatively the limit of the seat cleaning streams R1, R2 are thus also reached in that the particular partial stroke is not stationary generated, but rather oscillating.

To put into effect the preceding briefly illustrated switch movement of the closing elements 3, 4 (full opening stroke H, partially open positions T1 and T2) hence-forth the double seat valve is equipped with the device 100, 200 according to the invention, which has the main adjustment device 100 for the opening and closing of the double seat valve within the scope of the full opening stroke H (FIG. 1) and the individual adjustment devices 200 for the generation of the partially open positions T1, T2. The main adjustment device 100 corresponds in its design to a so-called standard actuator, with which a double seat valve of the type in question can be opened and closed on its own; Special functions, such as seat cleaning, cannot be done with this standard actuator. The main adjustment device 100 is designed in a manner in regards to its peripheral housing connections and other necessary connections, so that when eliminating the individual adjustment devices 200 it can be directly connected with a lantern housing 6, which is in fact adjusted in length but is otherwise not changed. The end (male threads) of the first control rod 3a is in this regard designed in such a way, that it is complementary to an end section (female threads) of a second actuator stem 203 of the individual adjustment device 200, as well as is complementary to an end section of a first actuator stem 103 of the main adjustment device 100, with which it is screwed in each case, if necessary. The second control rod 4a continues on above the cleaning solution connection 11 in a third actuator stem 204 designed as a hollow rod and ends in the individual adjustment devices 200.

Since the main adjustment device 100 and the individual adjustment devices 200 are axially decoupled from each other in a special operating condition of the double seat valve, especially the location of the first closing element 3 must be recorded if needed at every point in time, a position indicator rod 7a is provided, which each time concentrically penetrates the first actuator stem 103 completely and the second actuator stem 203 up to the first control rod 3a, which ends in the control device on one end and with its frontal end is screwed into the second actuator stem 203 which is tightly screwed with the first control rod 3a.

For the control of the main adjustment device 100 a first pressurizing medium connection 7b is provided on the control device 7 through which a first pressurizing medium flow D1 is charged or discharged. Alternatively to this the main adjustment device 100 can be charged using a fourth pressurizing medium connection 210 arranged on the individual adjustment devices 200 with an alternate first pressurizing medium flow D1*. To generate the partially open positions T1, T2 the individual adjustment devices 200 have a second and a third pressurizing medium connection 208, 209 available for a second and third pressurizing medium flow D2, D3.

Figure 2:
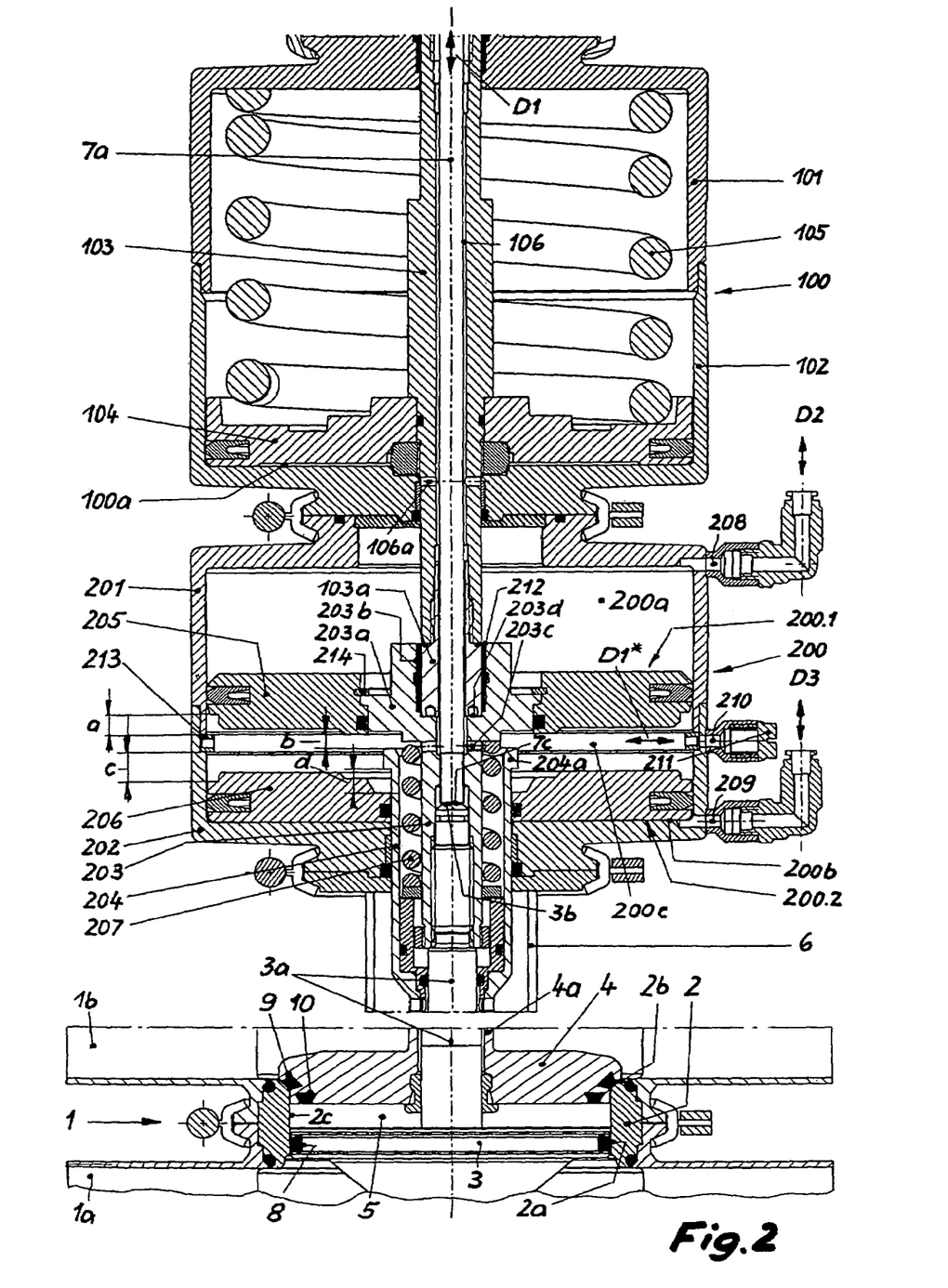
FIG. 2 shows a middle cross-section through the device according to FIG. 1, whereby the illustrated device represents the position of the movement dependent members so that these correspond to the closed position of the two closing elements which are represented in the lower area of the illustration in sections.
Figure 3:
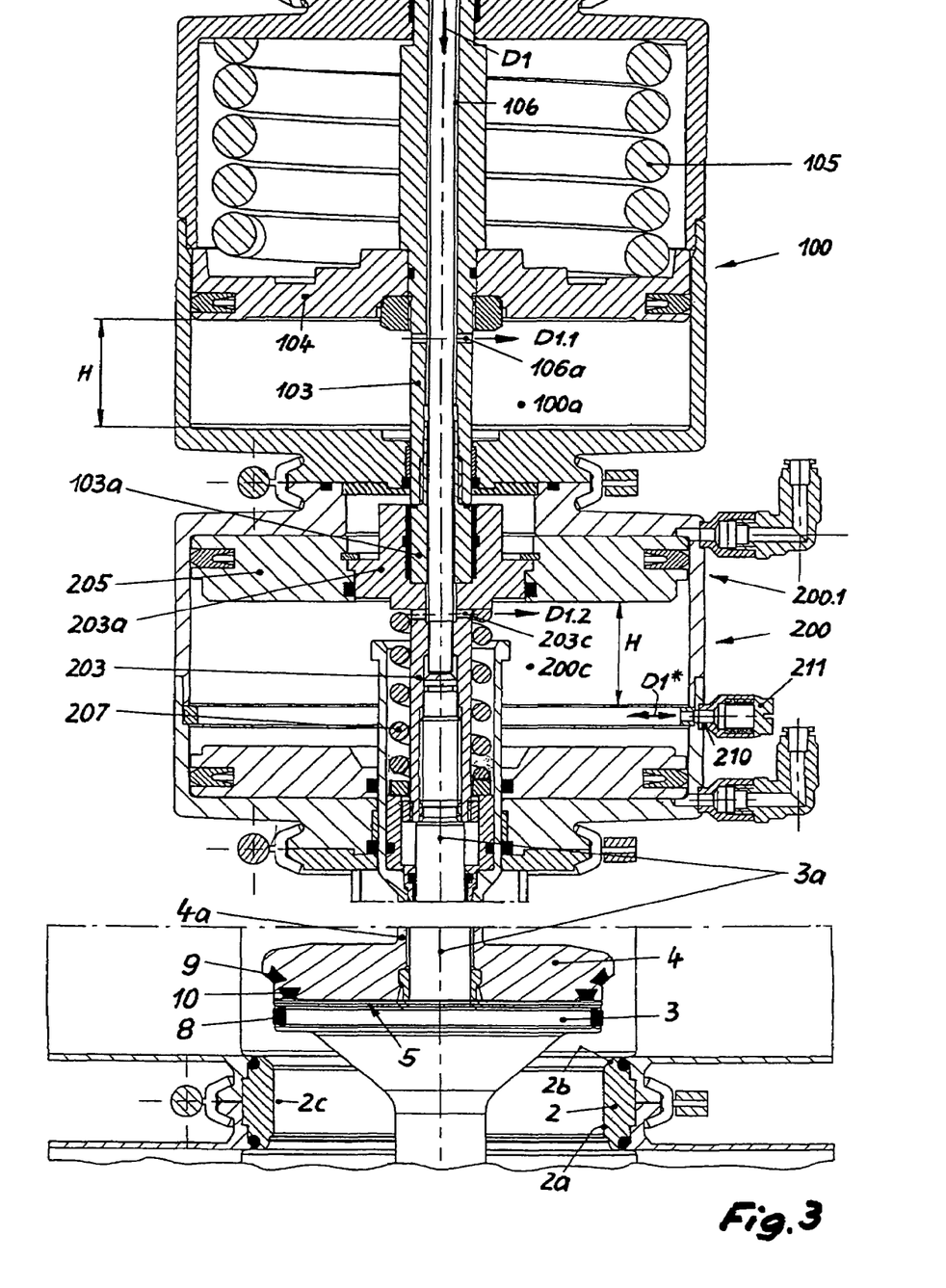
FIG. 3 also shows a device in middle cross-section and both arranged closing elements according to FIG. 2, whereby the members of the device coming into question henceforth are found in one of the corresponding locations of the full open positions of the two closing elements.

The housing of the main adjustment device 100 (FIG. 2; the multiplicity of seals of the device are here and in further figures not specified individually) consists of a first and a second housing member 101, 102, which are essentially made from housing rough parts of the same shape. A first actuating piston 104 with piston seal is arranged on the first actuator stem 103 and fixed there with a non-specified nut. A pretensioned main spring 105 finds its abutment on the one end on the first actuating piston 104 and on the other end on the first housing member 101. After the installation of the first actuating piston 104, the first actuator stem 103 and the main spring 105 in both housing members 101, 102 the latter are preferably integrally joined together, especially by welding. The seals and guide bushings in housing 101/102 of the main adjustment device 100 are also exchangeable after their final assembly. The hollow first actuator stem 103 penetrated by the position indicator rod 7a, and the ring channel 106 formed between these two rods 7a, 103 serve for the transport of the first pressurizing medium flow D1 or of the first alternate pressurizing medium flow D1*. In each case both reach through the first cross holes 106a as the first pressurizing medium flow D1.1 (s. FIG. 3) in a first pressurizing medium chamber 100a formed between the first actuator piston 104 and the second housing member 102, from where they also flow out in the opposite direction.

Below the main adjustment device 100 the individual adjustment devices 200 are additively inserted. The latter, seen from top to bottom, are made up of a first individual adjustment device 200.1 for generation of the first partially open position T1 of the first closing element 3 and by a second individual adjustment device 200.2 for generation of the second partially open position T2 of the second closing element 4. The housings of the individual adjustment devices 200 are formed from a third and a fourth housing member 201, 202, which are made essentially from housing rough parts of the same shape, and after the assembly of the mounting parts are preferably integrally joined together, especially by welding.

In the first individual adjustment device 200.1 a second actuating piston 205 provided on the circumference with a piston seal is arranged by which a headpiece 203a, which is molded on the second actuator stem 203 and enlarged in diameter compared to it, engages interlocking and sealing in such a way so that the second actuator stem 203 and the second actuating piston 205 can be seen as connected permanently together. A circlip 214 is used for fixing the headpiece 203a in the second actuating piston 205. Between the second actuating piston 205 and the third housing member 201 a second pressurizing medium chamber 200a is formed, which is connected with the second pressurizing medium connection 208.

Below the second actuating piston 205 a third working piston 206 is arranged with a provided piston seal on the circumference in the fourth housing member 202, which is positioned moveable in the axial direction in the interior on the third actuator stem 204 which is designed as a hollow rod and is able to be brought with this in the direction of the second partially open position T2 on a shaped recess 204a on the end of the actuator stem 204 in a clamped connection. A third pressurizing medium chamber 200b is formed between the third actuating piston 206 and the fourth housing member 202, which is connected with the third pressurizing medium connection 209. A fourth pressurizing medium chamber 200c is circumferentially encompassed by the housing of the individual adjustment device 201/202, on one face side by the second working piston 205 and on the other face side by the third working piston 206. The fourth pressurizing medium chamber 200c is fed if necessary either using the ring channel 106 and from this by a second pressurizing medium partial flow D1.2 (see FIG. 3) below the second cross hole 203c branching off from the headpiece 203a or using the fourth pressurizing medium connection 210 of the alternate first pressurizing medium flow D1*. In the illustrated exemplary embodiment the fourth pressurizing medium connection 210 is actually blinded by a sealing plug 211.

Between the headpiece 203a and the third actuator stem 204 a second spring 207 is arranged in the area of the second individual adjustment device 200.2 within an expansion of the third actuator stem 204 having a hollow rod shaped design, whose pretensioning is measured so that the second closing member 4, designed as a seat disc, is pressed in its closing position with sufficient force on the assigned second seat surface 2b. In the open position of the double seat valve (FIG. 3) the somewhat reduced pretensioning is still sufficient, because of an insignificant elongation of the second spring 207, to press the closing elements 3, 4 together with sufficient force so that the leakage chamber 5 is securely sealed from the environment by the seal 10.

The end-of-travel limit of the second actuating piston 205 for the first partially open position T1 (FIG. 4) and that of the third actuating piston 206 for the second partially open position T2 (FIG. 5) is done by a stop ring 213 axially movable on both sides, which is permanently arranged on housings 201/202 between the actuating pistons 205, 206. The first partially open position T1 results unavoidably by the axial distance between the stop ring 213 and the second actuating piston 205 (first partial piston travel a; T1=a), if the possible displacement between the headpiece 203a and the end of the third actuator stem 204 (second partial piston travel b) is measured so that a≦b is given (FIG. 2). Conformance to the condition a≧b guarantees on the other hand, that the closing element 4 is pressed by the headpiece 203a in the partially open position T1 statically determined by its assigned second seat surface 2b, which then supports the headpiece 203a on recess 204a and not directly over the second actuating piston 205 on the stop ring 213.

The possible travel distance of the third actuating piston 206 to its stop on the stop ring 213 is determined on the exterior by the third partial piston travel c, whereas the third actuating piston 206 can travel in the interior by a fourth partial piston travel d, which is designed inevitably smaller than the third partial piston travel c until it ends in the clamping connection with the recess 204a. As a result through the actuation of the third actuating piston 206 results in the second partially open position T2, which is determined (T2=c−d) by the difference [c−d] (FIG. 2).

The first control rod 3a is screwed with the second actuator stem 203 in the area of the second individual adjustment device 200.2 (FIG. 2). In order to prevent or at least to complicate a loosening of this screw connection, it is counter secured by the position indicator rod 7a. For this presses the latter, which for its part is coaxially screwed in the second actuator stem 203, with a second end surface 7c on a first end surface 3b of the first control rod 3a. Through this the position indicator rod 7a forms the immediate continuation of the first control rod 3a, so that by this arrangement the respective position of the first closing element 3 is securely acquired.

In the frontal end of the first actuator stem 103 reaching into the individual adjustment devices 200 a header 103a is screwed in, which engages into a cutout 203b within the headpiece 203a, whose diameter is enlarged compared to it and which is formed onto the second actuator stem 203. The header 103a is arranged in the cutout 203b movable both in the axial as well as the rotational direction, whereby the axial movement is limited by a stop face 203d, which forms the frontal end circumferential border of the recess 203b. To reduce the friction a plain bearing bush 212 is provided between the header 103a and the recess 203b. Through the pertinent embodiment in the area of the header 103a, the main adjustment device 100 and the individual adjustment devices 200 are axially and in the general direction of rotation decoupled from each other in the direction of the first partially open position T1.

The double seat valve is transported into its full open position H (FIG. 3) if the first pressurizing medium flow D1 of the proposed device is fed through the ring channel 106. The first pressurizing medium flow D1 branches out at the first cross hole 106a into the first pressurizing medium partial flow D1.1, which arrives in the first pressurizing medium chamber 100a of the main adjustment device 100, and into the second pressurizing medium partial flow D1.2, which almost at the same time loads the fourth pressurizing medium chamber 200c of the first individual adjustment device 200.1 through the second cross hole 203c. Alternatively to the preceding described loading of the pressurizing medium chambers 100a and 200c with pressurizing medium, their loading can also be done through the fourth pressurizing medium connection 210. In this case the alternate first pressurizing medium flow D1* first enters into the fourth pressurizing medium chamber 200c completely, in order to then divert the first pressurizing medium partial flow D1.1 from this through the second cross hole 203c, the ring channel 106 and the first cross holes 106a into the first pressurizing medium chamber 100a.

The two actuating pistons 104 and 205 loaded with pressurizing medium in this manner take hold directly or indirectly (through header 103a) with their respective opening force, which results from the respective pressure in the assigned pressurizing medium chamber 100a, 200c and each provided effective piston surface, on the first actuator stem 103 and therefore together override the pretensioned force of the main spring 105. Through the axial decoupling of the arrangement in the area of the header 103a/headpiece 203a combination the grabbing pressure and/or friction forces against the opening movement on the two closing elements 3, 4 can be overridden if necessary by only two second actuating pistons 205. Seen as a whole both actuating pistons 104, 205 in the process of the opening movement override the total resisting force which results from the pretensioning force of the main spring 105 and from the total pressure and/or friction forces, so that the first individual adjustment device 200.1 in this movement phase receives the task of a so-called batch actuator, whereby the preceding described diameter reduction of the main adjustment device 100 is justified and achievable.

The seat cleaning of the first closing element 3 (FIG. 4) is done by the introduction of the second pressurizing medium flow D2 in the second pressurizing medium chamber 200a of the first individual adjustment device 200.1 on the route over the second pressurizing medium connection 208. Thus the second actuating piston 205 which is loaded with pressurizing medium is pushed down in the partially open position T1=a (cf. also FIG. 2), whereby the assigned first seat surface 2a is exposed and the first seat cleaning stream R1 from the first valve housing member 1a reaches on the way over the gapwise opened seat 2a/8 into the leakage chamber 5. Since the first actuator stem 103 is end-of-travel limited in the direction of the individual adjustment devices 200, the header 103a also remains in its appropriate end position. Through the axial decoupling between the header 103a and headpiece 203a the second actuating piston 205 can axially slide itself onto the header 103a, so that the stop face 203d loosens itself from the later and distances so far until the actuating piston 205 takes its bearing on the exterior of the stop ring 213. In order to ensure a stop of the actuating piston 205 on the stop ring 213 and not over the headpiece 203a on frontal end of the third actuator stem 204, to the recess 204a, the condition a≦b must be met.

The seat cleaning of the second closing element 4 (FIG. 5) is achieved in that the third pressurizing medium flow D3 is introduced by the third pressurizing medium connection 209 into the third pressurizing medium chamber 200b of the second individual adjustment device 200.2. Thus the third actuating piston 206 which is loaded by pressurizing medium moves in the direction toward the stop ring 213. On its travel distance up to resting on this it must overcome the third partial piston travel c (cf. FIG. 2). Beforehand it gets in a clamping connection after the fourth partial piston travel d with its clamping flat 206a on recess 204a, so that after a stop on the stop ring 213 from the third actuator stem 204 and thus the required partially open position T2=c−d is completed from the second closing element 4 against the pretension force of the second spring 207. The latter finds an abutment on the headpiece 203a, which supports itself unmoveablely with its stop face 203d on the header 103a, since the latter is securely fastened by the first actuator stem 103 in connection with the first actuating piston 104 from the pretensioning force of the main spring 105 in this end position. Through the second partially open position T2 the second closing element 4 is removed gapwise from its assigned second seat surface 2b, so that the second seat cleaning stream R2 from the second valve housing member 1b reaches over the gap between the exposed second seat surface 2b and the second seat seal 9 into the leakage chamber 5.

Figures 6, 6A:
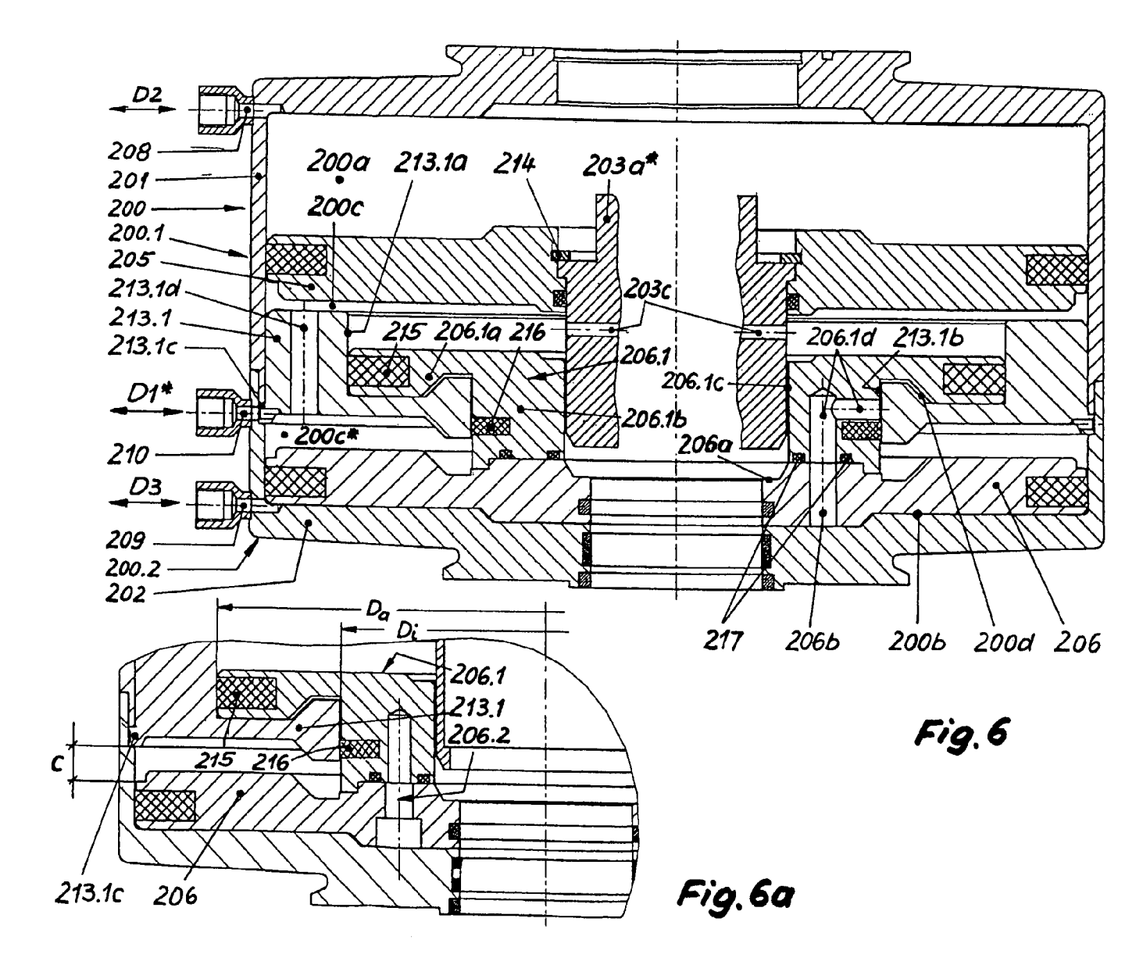

In the second individual adjustment device 200.2 inside the individual adjustment devices 200 (FIG. 6), in which the third actuating piston 206 with a so-called "batch function" is provided, the latter is connected tightly, however able to be loosened, on its side facing the second actuating piston 205 with a smaller diameter additional piston 206.1. The additional piston 206.1 working together with a housing ring 213.1 fixed on the housing 201/202 of the individual adjustment device 200 forms a fifth pressurizing medium chamber 200d, which is connected with a third pressurizing medium chamber 200b formed between the third actuating piston 206 and a non-specified bottom member of the fourth housing member 202. At the same time the additional piston 206.1 has a larger diameter exterior piston section 206.1a and a smaller diameter interior piston section 206.1b, whereby the exterior piston section 206.1a features an external diameter $D_a$ and the interior piston section 206.1b an internal diameter $D_i$ (FIG. 6a). The interior piston section 206.1b is sealed on its frontal end by means of seals 217 which are coaxially arranged with each other against the third actuating piston 206 and screwed with this using a number of bolted connections 206.2 arranged distributed over its circumference. The exterior piston section 206.1a is circumferentially sealed against the shell of a cylindrical recess 213.1a in the housing ring 213.1 by means of a first piston seal 215. In the same manner the interior piston section 206.1b is sealed circumferentially in a coaxial through bore 213.1b in the housing ring 213.1 by means of a second piston seal 216. The third pressurizing medium flow D3 is introduced over the third pressurizing medium connection 209 first to the third pressurizing medium chamber 200b. From there the pressurizing medium reaches over a first pressurizing medium channel 206b running between the two seals 217 in an axial direction through the third actuating piston 206, in order to finally reach into a second pressurizing medium channel 206.1d which is running corresponding with these in the additional piston 206.1 up to the fifth pressurizing medium chamber 200d.

The housing ring 213.1 has a circumferential radial projection 213.1c, with which it is positively fastened in the connection area between the third and the fourth housing member 201, 202. Between the housing ring 213.1 and the third actuating piston 206 a preceding fourth pressurizing medium chamber 200c* is designed, in which the fourth pressurizing medium connection 210 discharges. Through the latter the alternate first pressurizing medium flow D1* is charged or discharged for implementation of the full opening stroke H for the independently actuated closing element 3. The preceding fourth pressurizing medium chamber 200c* is connected through at least one connection channel 213.1d with the designed fourth pressurizing medium chamber 200c which is between the second actuating piston 205 on one side and the housing ring 213.1 in connection with the additional piston 206.1 on the other side, which is located in a part of the housing ring 213.1 containing the cylindrical recess 213.1a on the exterior.

The radial projection 213.1c is designed on its side facing the third actuating piston 206 in a manner so that the latter, after implementation of the second partial piston travel c (FIG. 6a), there meets an end-of-travel limit and thus the corresponding limit of the second partially open position T2 within the second individual adjustment device 200.2 is guaranteed.

A corresponding limit of the first partial piston travel a under the condition a≦b (cf. also FIG. 2) is done by the first individual adjustment device 200.1, which is put into effect by the first partially open position T1 in that the second actuating piston 205 comes to rest on the housing ring 213.1 which is permanently located on the housing 201/202. Under the condition a≧b after implementation of the first partially open position T1 a modified headpiece 203a* of the second actuator stem 203 (not specified) activated by the first closing element 3 comes to rest on recess 204a (also not specified), as was already described in connection with the first embodiment of the individual adjustment devices 200 according to the FIGS. 1 to 5, especially according to FIG. 4.

The third actuating piston 206 strikes over the clamping flat 206a on the recess 204a (cf. also FIG. 5), to produce the completion of the second partially open position T2 of the second closing element 4 in one or the other directions. The axial extension of the end of the modified headpiece 203a* facing the third actuating piston 206 makes it necessary to provide the additional piston 206.1 with a coaxial piston bore 206.1c, which surrounds the modified headpiece 203a* with clearance outside.

REFERENCE NUMBERS OF THE ABBREVIATIONS USED 1 valve housing
1a first valve housing member
1b second valve housing member
2 seat ring
2a first seat surface
2b second seat surface
2c connection orifice
3 first closing element
3a first control rod
3b first end surface
4 second closing element
4a second control rod
5 leakage chamber
6 lantern housing
7 control device
7a position indicator rod
7b first pressurizing medium connection
7c second end surface
8 first seat seal (radial)
9 second seat seal (radial, axial)
10 seal (axial)
11 cleaning solution connection
100 main adjustment device
100a first pressurizing medium chamber
101/102 main adjustment device housing
101 first housing member
102 second housing member
103 first actuator stem
103a header
104 first actuating piston
105 main spring
106 ring channel
106a first cross hole
200 individual adjustment device
200.1 first individual adjustment device
200.2 second individual adjustment device
200a second pressurizing medium chamber 200*b* third pressurizing medium chamber
200*c* fourth pressurizing medium chamber
200*c*\* preceding fourth pressurizing medium chamber
200*d* fifth pressurizing medium chamber
201/202 individual adjustment device housing
201 third housing member
202 fourth housing member
203 second actuator stem
203*a* headpiece
203*a*\* modified headpiece
203*b* cutout
203*c* second cross hole
203*d* stop face
204 third actuator stem
204*a* recess
205 second actuating piston
206 third actuating piston
206*a* clamping flat
206*b* first pressurizing medium channel
206.1 additional piston
206.1*a* exterior piston section
206.1*b* interior piston section
206.1*c* coaxial piston bore
206.1*d* second pressurizing medium channel
206.2 bolted connection
207 second spring
208 second pressurizing medium connection
209 third pressurizing medium connection
210 fourth pressurizing medium connection
211 sealing plug
212 plain bearing bush
213 stop ring
213.1 housing ring
213.1*a* cylindrical cutout
213.1*b* coaxial through-bore
213.1*c* radial projection
213.1*d* connection channel
214 circlip
215 first piston seal
216 second piston seal
217 seal
a first partial piston travel
b second partial piston travel
c third partial piston travel
d fourth partial piston travel
D1 first pressurizing medium flow
D1.1 first pressurizing medium partial flow
D1.2 second pressurizing medium partial flow
D1\* alternate first pressurizing medium flow
D2 second pressurizing medium flow
D3 third pressurizing medium flow
$D_a$ outer diameter
$D_i$ inner diameter
H full opening stroke (fully open position)
R cleaning solution
R1 first seat cleaning stream
R2 second seat cleaning stream
T1 first partially open position (T1=a)
T2 second partially open position (T2=c−d)

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

I claim:

1. Device for actuating double seat valves, especially for the food and beverage industry, comprising
a first closing element (3) and a second closing element (4), the first and second closing elements (3,4) movable independently of one another;
a leakage chamber (5), the leakage chamber (5) being enclosed by the first and second closing elements (3,4),
the leakage chamber (5) being connected over at least one path of travel with the environment of a double seat valve,
the first closing element (3) being designed as a sliding piston,
after a partial stroke the first closing element (3) coming to rest on the second closing element (4), the second closing element designed as a seat disc, the second closing element (4) having a further opening movement, the partial stroke and the further opening movement causing a full open position (H);
a first control rod (3*a*, 203) and a second control rod (4*a*, 204), the first and second control rods (3*a*, 203, 4*a*, 204) fitting into one another in a telescoping manner and extending outward on the side of the second closing element (4) from a valve housing (1),
the first closing element (3) having a first partially open position (T1) and the second closing element (4) having a second partially open position (T2),
the full open position (H) being generated through a main adjustment device (100) an individual adjustment device (200) comprising a first individual adjustment device (200.1) and a second individual adjustment device (200.2), the first individual adjustment device (200.1) generating the first partially open position (T1) of the first closing elements (3) and the second individual adjustment device (200.2) generating the second partially open position (T2) of the second closing element (4);
and an adjustment of the first and second closing elements (3,4) being done by a first actuating piston (104), a second actuating piston (205) and a third actuating piston (206 or 206/206.1) loaded by a pressurizing medium acting on the first and second control rods (3a, 203; 4a, 204), characterized in that the first and second individual adjustment devices (200; 200.1, 200.2) are designed independently and are additively inserted between the main adjustment device (100) and the valve housing (1), the third actuating piston (206; 206/206.1) being positioned axially moveable on the second control rod (4a, 204), the second control rod (4a, 204) being hollow, the second control rod (4a, 204) surrounding the first control rod (3a, 203) and able to be brought with the first control rod (3a, 203) in the direction of the second partially open position (T2) in a clamping connection, the second actuating piston (205) being permanently connected on one side with the first control rod (3a, 203) which adjusts the first closing element (3), the first control rod (3a, 203) being alternatively directly or indirectly axially movable positioned on a first actuator stem (103) of the main adjustment device (100) and able to be brought with the first actuator stem (103) in the direction of the full open position (H) in a clamping connection, and the second actuating piston (205) being able to be loaded with pressurizing medium on each of its two piston surfaces.

2. Device according to claim 1, characterized, in that the first and second individual adjustment devices (200.1, 200.2) are arranged in a single housing comprising a third housing member (201) and a fourth housing member (202), a second actuating piston (205), a third actuating piston (206 or 206/206.1), the third and fourth housing members (201, 202) and the second and third actuating pistons (205, 206 or 206/206.1) forming a second pressurizing medium chamber (200a), a third pressurizing medium chamber (200b) and a fourth pressurizing medium chamber (200c or 200c/200c*). each of the second, third and fourth pressurizing medium chambers (200a, 200b, 200c or 200c/200c*) being able to be controlled independently of each other, the second pressurizing medium chamber (200a) being between the second actuating piston (205) and the third housing member (201), the third pressurizing medium chamber (200b) being between the third actuating piston (206) and the fourth housing member (202) and the fourth pressurizing medium chamber (200c or 200c/200c*) being between the second and third actuating pistons (205, 206).

3. Device according to claim 1, characterized in that the first actuator stem (103, 103a) of the main adjustment device (100) extends out from the main adjustment device (100) in the direction of the first and second individual adjustment device (200; 200.1, 200.2) and there is guided moveable axially into the front end of a second actuator stem (203, 203a or 203a*), the second actuator stem being permanently connected with the first control rod (3a), up to a stop face (203d).

4. Device according to claim 1, characterized in that the third actuating piston (206) on its side facing the second actuating piston (205) is connected tightly with a smaller diameter additional piston (206.1), but the third actuating piston (206) is however able to be loosened, the additional piston (206.1) working together with a housing ring (213.1) fixed on third and fourth housing members (201/202) of the individual adjustment device (200) forms a fifth pressurizing medium chamber (200d), the fifth pressurizing medium chamber (200d) is connected with a third pressurizing medium chamber (200b), the third pressurizing medium chamber formed between the third actuating piston (206) and the fourth housing member (202), and that with the introduction of a third pressurizing medium flow (D3) to the third pressurizing medium chamber (200b) an additional force affecting the additional piston (206.1) results additionally in the fifth pressurizing medium chamber (200d), which additively superimposes on a force affecting the third actuating piston (206).

5. Device according to claim 4, characterized in that the additional piston (206.1) has a larger diameter exterior piston section (206.1a) and a smaller diameter interior piston section (206.1b), that the interior piston section (206.1b) is sealed on its frontal end from the third actuating piston (206) and the interior piston section (206.1b) is screwed with the third actuating piston (206), that the exterior piston section (206.1a) is sealed on its circumference from the shell of a cylindrical cutout (213.1a) in the housing ring (213.1) the interior piston section (206.1b) is sealed on its circumference in a coaxial through bore (213.1b) in the housing ring (213.1), and that in a connection area of the third actuating piston (206) with the additional piston (206.1) are arranged in the third actuating piston (206) a first pressurizing medium channel (206b) and in the additional piston (206.1) a second pressurizing medium channel (206.1d), which correspond with one another and connect the third pressurizing medium chamber (200b) and the fifth pressurizing medium chamber (200d) with one another permeable to the pressurizing medium.

6. Device according to claim 4, characterized in that the housing ring (213.1) has a radial projection (213.1c) on its circumference, with which the housing ring (213.1) is fixed interlocking in a connection area between the third and fourth housing members (201, 202).

7. Device according to one of the claim 4, characterized in that a fourth pressurizing medium connection (210) for an alternate first pressurizing medium flow (D1*) for loading of the second actuating piston (205) located in the third housing member (201) discharges in a preceding fourth pressurizing medium chamber (200c*) in an area between the third actuating piston (206) and the housing ring (213.1), and that the preceding fourth pressurizing medium chamber (200c*) is connected with the fourth pressurizing medium chamber (200c) formed between the second actuating piston (205) on one side and the housing ring (213.1) in connection with the additional piston (206.1) on the other side through at least one connection channel (213.1d), which is located in an exterior part of the housing ring (213.1) containing a cylindrical cutout (213.1a).

8. Device according to claim 1, characterized in that an end-of-travel limit of the second actuating piston (205) for the first partially open position (T1) and that of the third actuating piston (206; 206/206.1) for the second partially open position (T2) is done by a stop ring (213) or a housing ring (213.1), axially moveable on both sides, and permanently located on third and fourth housing members (201/202) between the second and third actuating pistons (205, 206).

9. Device according to claim 2, characterized in that the fourth pressurizing medium chamber (200c) is connected according to a stream with a first pressurizing medium connection (7b), which is provided with a control device (7) located in a connection to the main adjustment device (100).

10. Device according to claim 2, characterized in that the fourth pressurizing medium chamber (200c) is connected in the direction of a stream to a fourth pressurizing medium connection (210), which is proved on the third and fourth housing members (201/202) of the individual adjustment device (200).

11. Device according to claim 9, characterized in that the first pressurizing medium connection (7b) is also additionally connected in the direction of the stream with a first pressurizing medium chamber (100a) of the main adjustment device (100).

12. Device according to claim 1, characterized in that the first actuator stem (103) is arranged able to rotate against the second actuating piston (205) or with a second actuator stem (203, 203a or 203a*) connected with this.

13. Device according to claim 12, characterized in that a frontal end of the first actuator stem (103) supports a header (103a), which engages in a cutout (203b) inside a headpiece (203a or 203a*) formed on the second actuator stern (203), the headpiece (203a or 203a*) having a diameter enlarged in comparison to the second actuator stem (203).

14. Device according to claim 13, characterized in that a plain bearing bush (212) is located between the header (103a) and the cutout (203b).

15. Device according to claim 1, characterized in that the first control rod (3a) is screwed with the second actuator stem (203) in the area of the second individual adjustment device (200.2), that a position indicator rod (7a) is provided which each time concentrically penetrates a first actuator stem (103, 103a) completely and the second actuator stem (203, 203a or 203a*) up to the first control rod (3a), which ends on one side in a control device (7) and on the other side is screwed into the second actuator stem (203) with its frontal end and thereby counter secures the screw connection with its assigned second end surface (7c) between the control rod and the first control rod (3a, 203) of a first end surface (3b).

16. Device according to claim 15, characterized in that the position indicator rod (7a) forms a continuous ring channel (106) with the first actuator stem (103), a header (103a), a headpiece (203a; 203a*) and the second actuator stem (203), each of which it surrounds in the named sequence, which branches over a first cross hole (106a) in a first pressurizing medium chamber (100a) of the main adjustment device (100) and over a second cross hole (203c) in a fourth pressurizing medium chamber (200c) of the individual adjustment device (200).

17. Device according to claim 1, characterized in that a housing member (101, 102) of the main adjustment device (100) and each (201, 202) housing of the individual adjustment devices (200) are made from housing rough parts of the same shape.

18. Device according to claim 1, characterized in that a housing member (101, 102) of the main adjustment device (100) and each (201, 202) housing of the individual adjustment devices (200) are each integrally joined together.

19. Device according to claim 1, characterized in that the first, second and third actuating pistons (104, 205, 206, 206/206.1) are made of corrosion resistant light alloy metal.

* * * * *